（12）United States Patent
Kitazono et al.

(10) Patent No.: US 9,926,205 B2
(45) Date of Patent: Mar. 27, 2018

(54) METHOD FOR PRODUCING ANTIMONY TRISULFIDE

(71) Applicant: NIHON SEIKO CO., LTD., Tokyo (JP)

(72) Inventors: Satoshi Kitazono, Yabu (JP); Shota Ishida, Yabu (JP)

(73) Assignee: Nihon Seiko Co., Ltd. (JP)

( * ) Notice: Subject to any disclaimer, the term of this patent is extended or adjusted under 35 U.S.C. 154(b) by 15 days.

(21) Appl. No.: 14/432,798

(22) PCT Filed: Oct. 2, 2012

(86) PCT No.: PCT/JP2012/075451
§ 371 (c)(1),
(2) Date: Apr. 1, 2015

(87) PCT Pub. No.: WO2014/054112
PCT Pub. Date: Apr. 10, 2014

(65) Prior Publication Data
US 2015/0259216 A1    Sep. 17, 2015

(51) Int. Cl.
*C01G 30/00* (2006.01)

(52) U.S. Cl.
CPC ........ *C01G 30/008* (2013.01); *C01P 2004/61* (2013.01); *C01P 2004/62* (2013.01)

(58) Field of Classification Search
None
See application file for complete search history.

(56) References Cited

U.S. PATENT DOCUMENTS

| 2003/0121916 A1* | 7/2003 | Ishihara | C03B 32/00 220/2.2 |
| 2009/0212199 A1* | 8/2009 | Nariyuki | H01L 27/14676 250/214 R |
| 2012/0001356 A1* | 1/2012 | Chang | B01J 19/0093 264/9 |

FOREIGN PATENT DOCUMENTS

| CN | 1103895 | * | 6/1995 |
| CN | 101786661 | * | 3/2010 |
| CN | 101786661 A | | 7/2010 |
| CN | 102126755 | * | 7/2011 |
| CN | 101786661 | * | 8/2011 |

(Continued)

OTHER PUBLICATIONS

Translation of: Lixia, Chen et al. CN 101786661 (2011).*
(English translation of CN 101786661) (Jun. 1995).*

*Primary Examiner* — Sheng H Davis
(74) *Attorney, Agent, or Firm* — Harness, Dickey & Pierce, P.L.C.

(57) ABSTRACT

A method for producing antimony trisulfide can inexpensively produce antimony trisulfide that has a relatively low content of lead, arsenic, and crystalline silica (i.e., impurities). The method includes charging a reaction vessel with an antimony trioxide powder and sulfur, and heating the inside of the reaction vessel to react antimony trioxide with sulfur. Since antimony trioxide is obtained by volatilization-oxidation refining, antimony trioxide has a small particle size and a large specific surface area, and exhibits good reactivity, and high-purity antimony trioxide having a low content of impurities (e.g., lead, arsenic, and crystalline silica) is easily available. It is possible to inexpensively produce antimony trisulfide having a low content of impurities by utilizing high-purity antimony trioxide as a raw material.

16 Claims, 5 Drawing Sheets

(56) References Cited

FOREIGN PATENT DOCUMENTS

| JP | H01-203255 A | 8/1989 |
|---|---|---|
| JP | H03-237018 A | 10/1991 |
| JP | H06-322455 A | 11/1994 |
| JP | H06-329417 A | 11/1994 |
| SU | 882934 | * 11/1981 |

* cited by examiner

REACTION TIME (HR:MIN)

AMOUNT OF RAW MATERIAL SULFUR
WITH RESPECT TO THEORETICAL AMOUNT (FACTOR)

PRECIPITATION
OF ANTIMONY METAL

METHOD FOR PRODUCING ANTIMONY TRISULFIDE

CROSS-REFERENCE TO RELATED APPLICATIONS

This application is a U.S. National Stage Application of International Application No. PCT/JP2012/075451, filed on Oct. 2, 2012, and published in Japanese as WO 2014/054112 A1 on Apr. 10, 2014. The entire disclosure of the above application is incorporated herein by reference.

TECHNICAL FIELD

The present invention relates to a method for producing antimony trisulfide that is used for a brake pad and the like.

BACKGROUND ART

Most of the antimony trisulfide available on the market is produced by processing natural antimony trisulfide ore (stibnite). Specifically, when natural antimony trisulfide ore is melted, antimony trisulfide precipitates, while impurities such as gangue float up. Antimony trisulfide can thus be collected.

Antimony trisulfide can also be produced by mixing an antimony metal powder and sulfur, and calcining the mixture. Antimony metal can be produced using the method disclosed in JP-A-6-322455, for example.

It is also possible to collect antimony trisulfide that precipitates when antimony trioxide is added to a sodium sulfide solution, and hydrogen sulfide is passed through the solution. Antimony trioxide can be obtained by volatilization-oxidation refining disclosed in JP-A-6-329417, for example. Antimony trioxide is abundantly available on the market as a fine powder.

SUMMARY OF INVENTION

Technical Problem

Since antimony trisulfide produced using the method that produces antimony trisulfide from natural antimony trisulfide ore has a relatively high content of lead, arsenic, and crystalline silica (quartz) (i.e., impurities), it has been desired to reduce the content of these impurities taking account of the natural environment and the working environment during the production process.

When using the method that produces antimony trisulfide from an antimony metal powder, the metal powder precipitates under molten sulfur, and reactivity is poor. The reactivity can be relatively improved by utilizing an antimony metal powder having a particle size of 10 micrometer or less that is obtained by grinding an antimony mass. However, the particle size of antimony metal obtained by grinding an antimony mass is normally 20 to 30 micrometers, and it is very expensive to obtain an antimony metal powder having a particle size of 10 micrometer or less by grinding an antimony mass.

The method that adds antimony trioxide to a sodium sulfide solution, and passes hydrogen sulfide through the solution is more expensive than the method that produces antimony trisulfide from an antimony metal powder.

An object of the invention is to provide a method for producing antimony trisulfide that can inexpensively produce antimony trisulfide that has a relatively low content of lead, arsenic, and crystalline silica (i.e., impurities).

Solution to Problem

According to one aspect of the invention, a method for producing antimony trisulfide includes charging a reaction vessel with an antimony trioxide powder and sulfur, and heating the inside of the reaction vessel to react antimony trioxide with sulfur.

When the antimony trioxide powder and sulfur are heated inside the reaction vessel, sulfur takes oxygen from antimony trioxide to form $SO_2$, and vaporizes, while Sb and S bond to each other to produce $Sb_2S_3$ (see the following reaction formula).

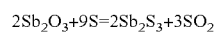

$$2Sb_2O_3 + 9S = 2Sb_2S_3 + 3SO_2$$

Since antimony trioxide is obtained by volatilization-oxidation refining, antimony trioxide has a small particle size and a large specific surface area, and exhibits good reactivity. Moreover, high-purity antimony trioxide having a low content of impurities (e.g., lead, arsenic, and crystalline silica) is easily available. It is possible to inexpensively produce antimony trisulfide having a low content of impurities by utilizing high-purity antimony trioxide as a raw material.

The method for producing antimony trisulfide according to one aspect of the invention achieves a high reaction efficiency as compared with the case of producing antimony trisulfide from an antimony metal powder and a sulfur powder.

FIG. 6 is a view illustrating production of antimony trisulfide from an antimony metal powder and a sulfur powder, wherein the left side illustrates a state in which a reaction vessel 20 is charged with a raw material 3' prepared by mixing an antimony metal powder and a sulfur powder, and the right side illustrates a state in which sulfur is melted by heating the raw material 3'. Since the specific gravity (about 1.8) of liquid sulfur is significantly lower than the specific gravity (about 6.7) of antimony metal, antimony metal easily precipitates in liquid sulfur, and unreacted antimony metal that does not come in contact with sulfur tends to remain in the lower part of the reaction vessel 20.

FIG. 7 is a view illustrating production of antimony trisulfide from an antimony trioxide powder and a sulfur powder according to one aspect of the invention, wherein the left side illustrates a state in which a reaction vessel 20 is charged with a raw material 3 prepared by mixing an antimony trioxide powder and a sulfur powder, and the right side illustrates a state in which sulfur is melted by heating the raw material 3. The specific gravity (about 5.2) of antimony trioxide is higher than the specific gravity (about 1.8) of liquid sulfur, but is lower than the specific gravity (about 6.7) of antimony metal. Since bubbles 4 of sulfurous acid gas are formed by the reaction of antimony trioxide with liquid sulfur which perturb the raw material 3, antimony trioxide rarely precipitates in liquid sulfur, and unreacted antimony trioxide rarely remains in the reaction vessel 20.

It is preferable that the antimony trioxide powder have an average particle size of 2 micrometers or less. If the average particle size of the antimony trioxide powder exceeds 2 micrometers, a deterioration in reactivity and an increase in energy cost may occur, and unreacted antimony trioxide may remain in the resulting antimony trisulfide.

Note that the term "average particle size" used herein refers to an equivalent specific surface diameter calculated based on a specific surface area determined in accordance with JIS Z 8830 ("Determination of the specific surface area of powders (solids) by gas adsorption-BET method").

It is preferable that the inside of the reaction vessel be heated at 250 to 700° C. If the heating temperature is less than the 250° C., the timing at which sulfur is melted and the reaction starts may be delayed. If the heating temperature exceeds 700° C., it may be a waste of energy.

Sulfur may be used in an amount larger than the stoichiometric amount of the product, and the inside of the reaction vessel may be heated after filling the reaction vessel with an inert gas.

The stoichiometric amount of antimony trioxide is 2 mol, and the stoichiometric amount of sulfur is 9 mol. It is preferable to use sulfur in an amount of 10 to 11 mol based on 2 mol of antimony trioxide.

This makes it possible to suppress a situation in which unreacted antimony trioxide remains in the resulting antimony trisulfide.

The reaction vessel may include a gas inlet and a gas outlet. An inert gas such as nitrogen may be fed through the gas inlet before heating the reaction vessel to fill the reaction vessel with the inert gas. The inert gas may be fed through the gas inlet after producing antimony trisulfide by heating the inside of the reaction vessel to discharge vaporized sulfur gas from the reaction vessel through the gas outlet.

Note that the inert gas may be continuously fed to the reaction vessel (i.e., purging) while producing antimony trisulfide by heating the inside of the reaction vessel.

This makes it possible to prevent a situation in which antimony reacts with oxygen in air.

Antimony trisulfide produced may be melted by heating the antimony trisulfide to a temperature equal to or higher than its melting point, discharged from the reaction vessel in the form of a liquid, and solidified by cooling. The melting point of antimony trisulfide is 550° C.

This makes it possible to continuously produce antimony trisulfide using a reaction vessel.

Advantageous Effects of the Invention

One aspect of the invention can thus inexpensively and easily produce antimony trisulfide that has a relatively low content of lead, arsenic, and crystalline silica (i.e., impurities).

DESCRIPTION OF EMBODIMENTS

Figure 1:
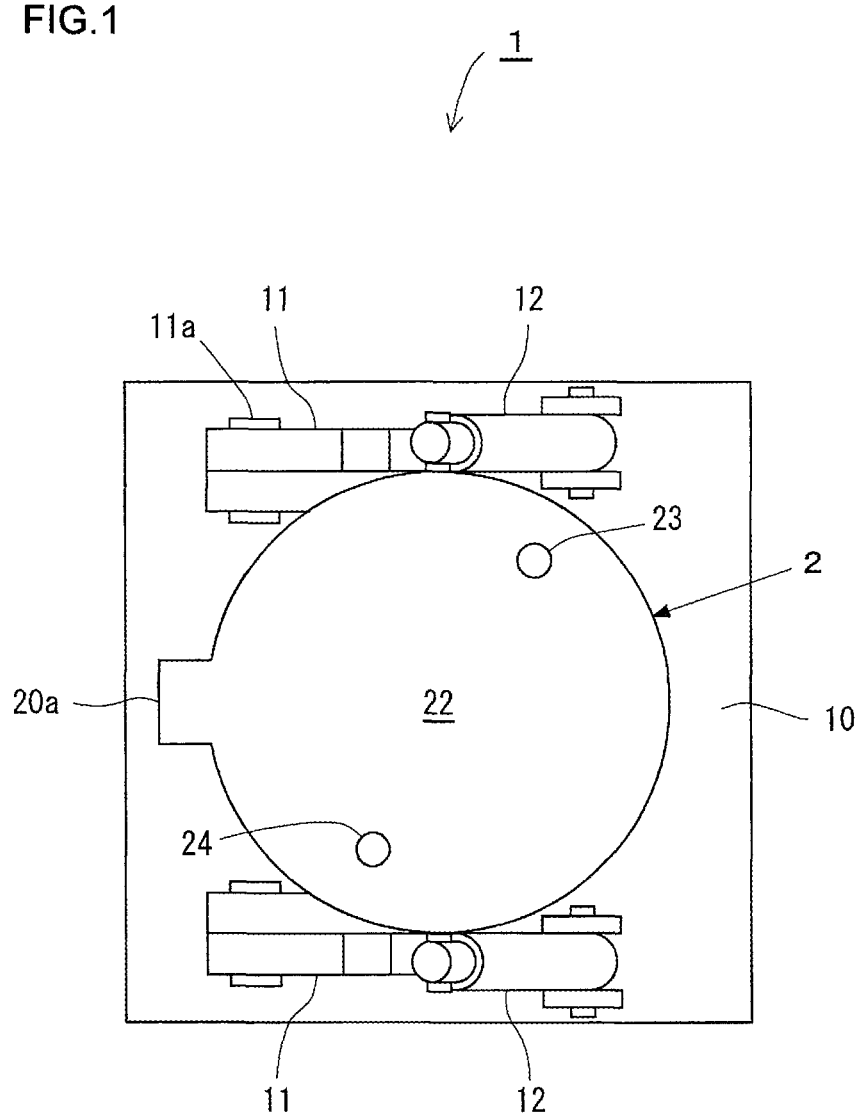
FIG. 1 is a plan view illustrating production equipment 1 according to one embodiment of the invention.
Figure 2:
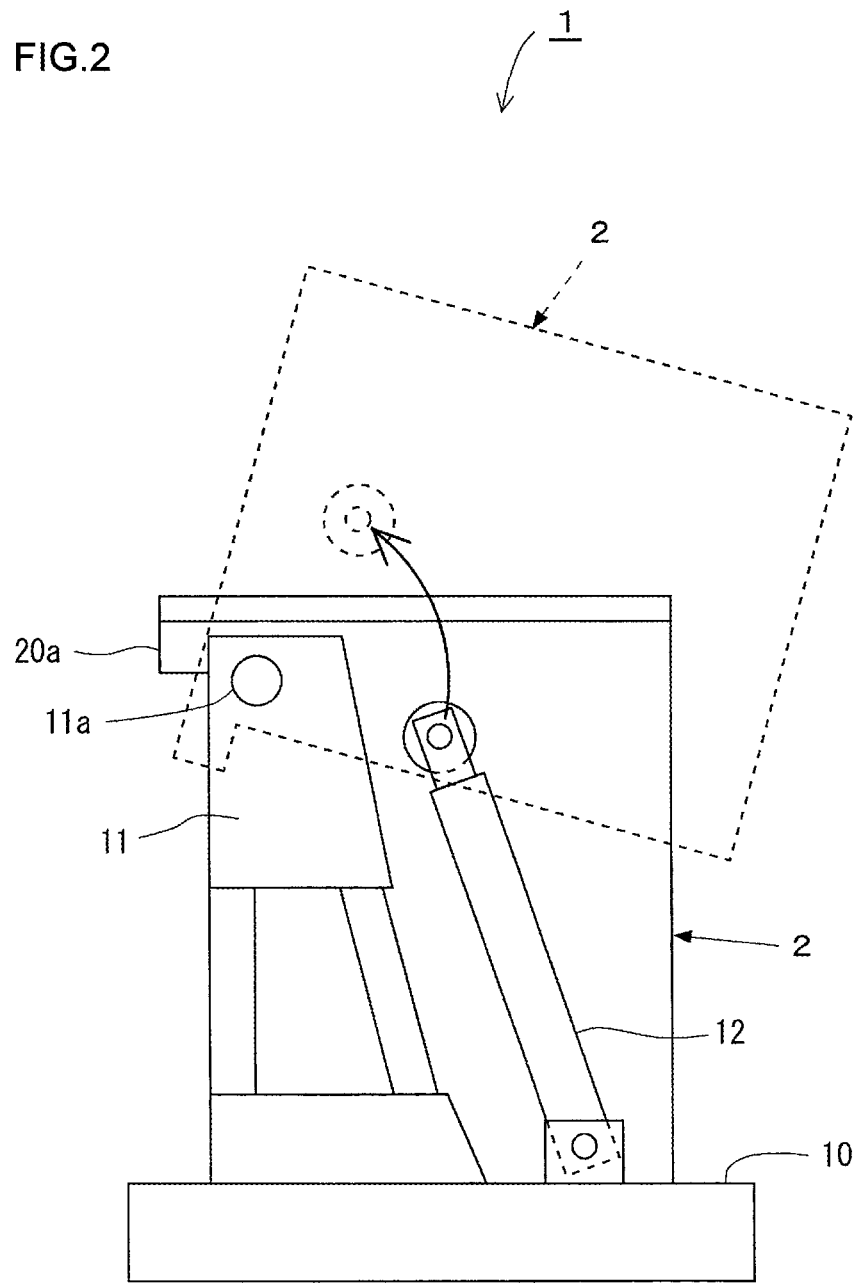
FIG. 2 is a side view illustrating the production equipment 1.
Figure 3:
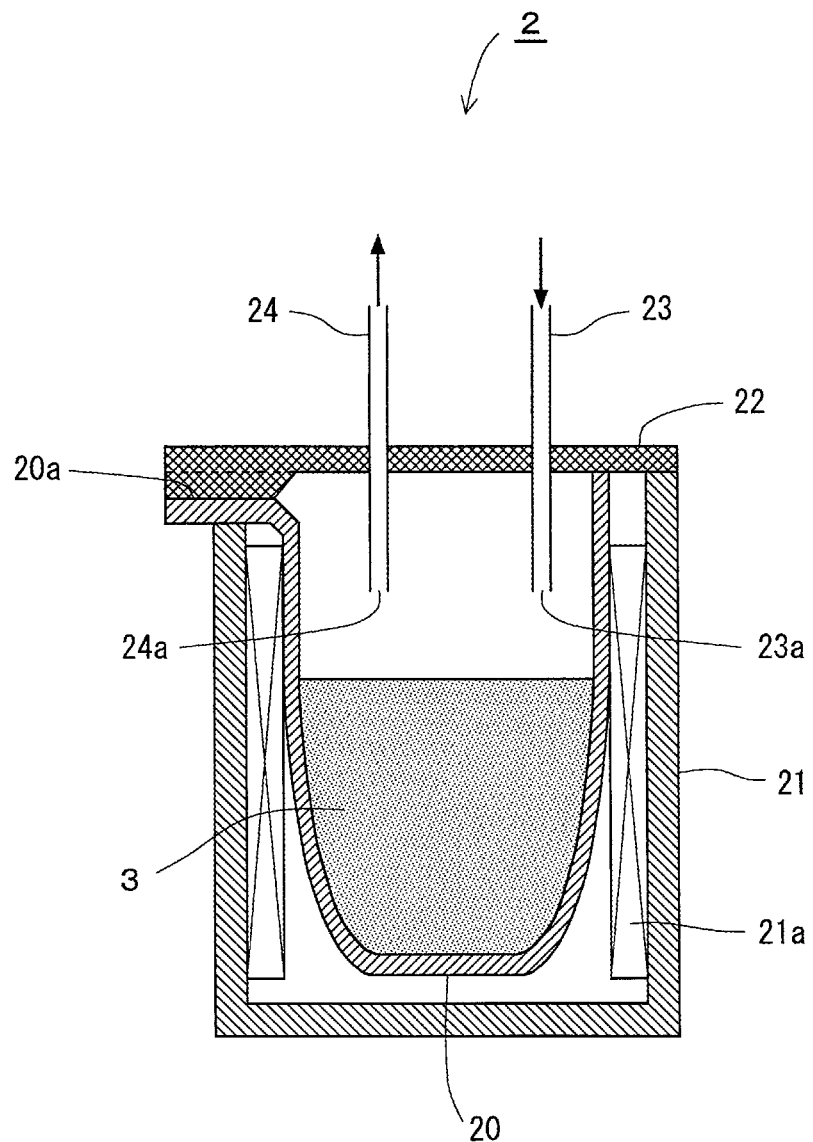
FIG. 3 is a cross-sectional view illustrating a vessel section 2 of the production equipment 1.

FIGS. 1 to 3 illustrate antimony trisulfide production equipment 1 according to one embodiment of the invention.

The production equipment 1 includes a vessel section 2, a stage 10, a support section 11, and a cylinder 12. The vessel section 2 is rotatably supported by a rotary shaft 11a of the support section 11, and is rotated by the cylinder 12.

The vessel section 2 includes a reaction vessel (crucible) 20, an electric furnace 21, and a lid 22. The reaction vessel 20 is fitted inside the electric furnace 21, and is heated by a heater 21a. The lid 22 is made of glass wool or the like, and is removable. Quartz tubes 23 and 24 are provided through the lid 22. The end of the quartz tube 23 serves as an inlet 23a for introducing an inert gas (nitrogen gas), and the end of the quartz tube 24 serves as an outlet 24a for discharging gas contained in the reaction vessel. The quartz tube 24 is connected to a desulfurization device (not illustrated in the drawings), and gas discharged from the reaction vessel is desulfurized. Note that reference sign 20a indicates an outlet for discharging the resulting antimony trisulfide, and reference sign 3 indicates a raw material.

The raw material 3 was prepared by mixing an antimony trioxide fine powder and a sulfur powder in a weight ratio of 5:3 (molar ratio: 2:10.9). Antimony trioxide had an average particle size of 1.17 micrometers, and had an $Sb_2O_3$ content of 99.82 wt %, an As content of 0.03 wt % or less, a Pb content of 0.001 wt % or less, and an Fe content of less than 0.001 wt %. Sulfur had a particle size of less than 90 micrometers.

Figure 4:
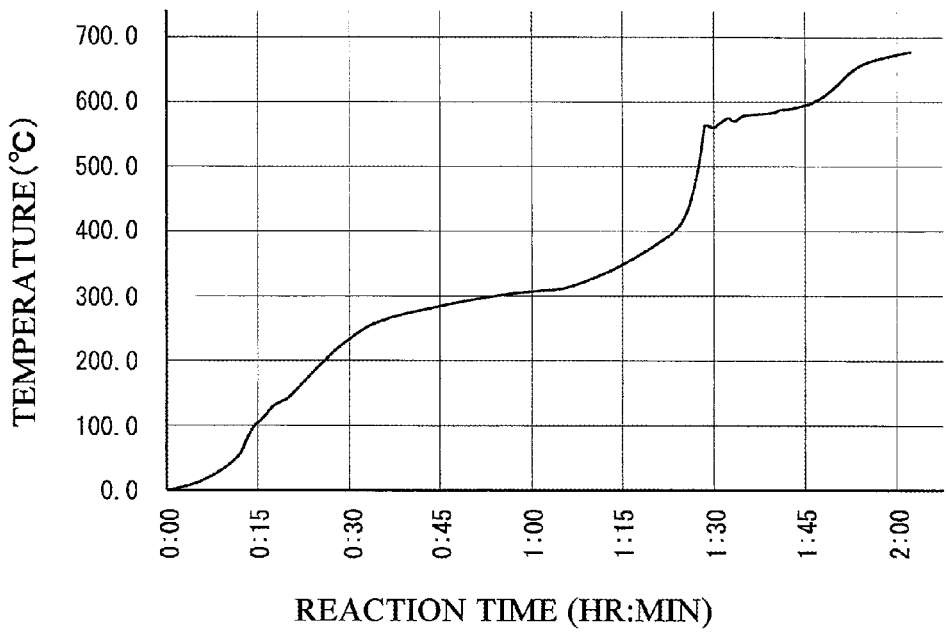
FIG. 4 illustrates the temperature inside a reaction vessel according to one embodiment of the invention.

After charging the reaction vessel 20 with the raw material, the lid 22 was fitted (see FIG. 3), and nitrogen gas was fed to the reaction vessel 20 through the quartz tube 23 to completely replace the atmosphere (air) inside the reaction vessel 20 with the nitrogen gas. The reaction vessel 20 was then heated using the electric furnace. As illustrated in FIG. 4, the temperature inside the reaction vessel 20 rapidly increased to about 580° C. due to heat of reaction after 400° C. had been reached. The remaining sulfur was almost completely vaporized when about 2 hours had elapsed from the start of heating. Therefore, nitrogen gas was fed to the reaction vessel 20 through the quartz tube 23 to completely discharge the sulfur gas from the reaction vessel 20. After removing the lid 23, the vessel section 2 was rotated (see the broken line in FIG. 2) to remove molten antimony trisulfide through the outlet 20a. Antimony trisulfide thus removed was solidified by natural cooling.

Antimony trisulfide thus produced was crushed, and subjected to componential analysis. The results are shown in Table 1.

TABLE 1

|  | Example | Comparative Example |
| --- | --- | --- |
| Sb (wt %) | 71.91 | 71.19 |
| S (wt %) | 27.03 | 26.18 |
| Pb (wt %) | 0.00 | 0.06 |
| As (wt %) | 0.03 | 0.05 |
| Fe (wt %) | 0.03 | 0.72 |
| $SiO_2$ (wt %) | <0.001 | 0.69 |
| $Sb_2O_3$ (wt %) | 1.7 | 4.5 |
| $Sb_2S_3$ (wt %) | 98.3 | 95.5 |
| Free sulfur (wt %) | 0.15 | 0.06 |

Antimony trisulfide of the comparative example shown in Table 1 was produced from natural antimony trisulfide ore.

As shown in Table 1, antimony trisulfide produced using the method according to one embodiment of the invention had a significantly low content of impurities such as lead, arsenic, and crystalline silica, as compared with antimony trisulfide of the comparative example. The content of antimony trioxide and free sulfur remaining in the product was very low due to high reactivity.

Figure 5:
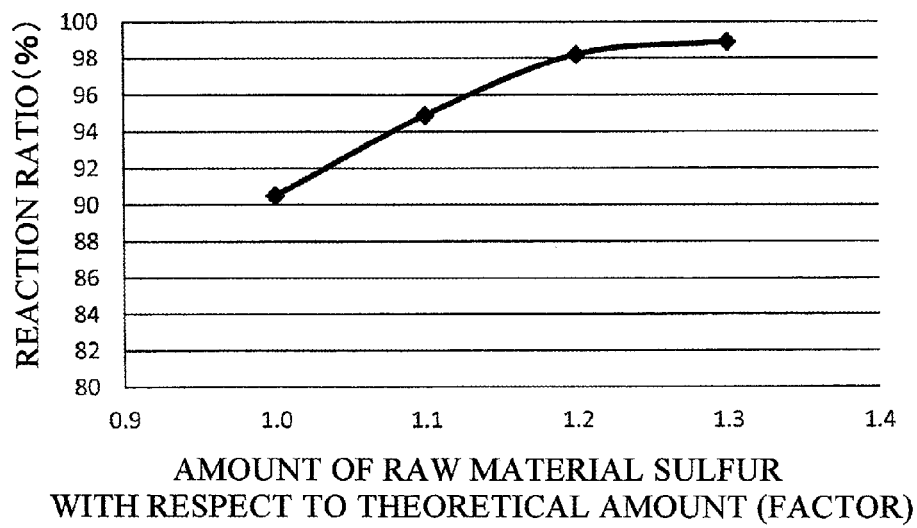
FIG. 5 illustrates the relationship between the amount of raw material sulfur and the reaction ratio.
Figure 6:
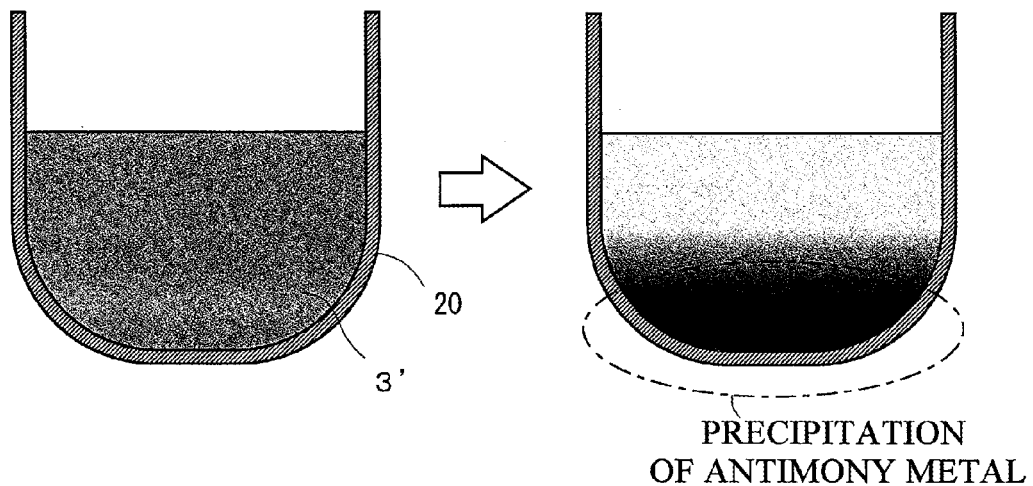
FIG. 6 illustrates production of antimony trisulfide from an antimony metal powder and a sulfur powder.
Figure 7:
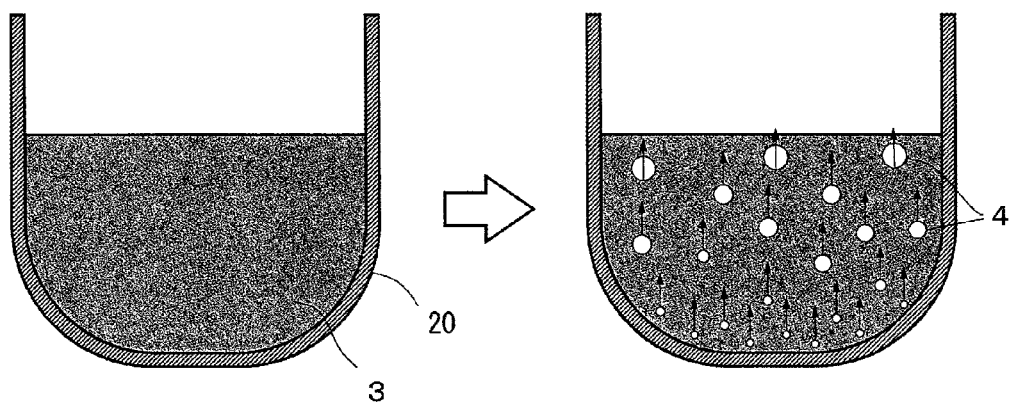
FIG. 7 illustrates production of antimony trisulfide from an antimony trioxide powder and a sulfur powder.

Antimony trisulfide was produced using a raw material prepared by mixing antimony trioxide having an average particle size of 1.17 micrometers and sulfur having a particle size of less than 90 micrometers while changing the amount of sulfur by a factor of 1.0, 1.1, 1.2, and 1.3 with respect to the theoretical amount (stoichiometric amount) to determine the reaction ratio (i.e., the content (mass %) of antimony trisulfide in the product). The results are shown in FIG. 5. The reaction ratio was about 95% when the amount of sulfur was larger than the theoretical amount by a factor of 1.1, and exceeded 98% when the amount of sulfur was larger than the theoretical amount by a factor of 1.2, and the difference between the reaction ratio when the amount of sulfur was larger than the theoretical amount by a factor of 1.2 and the reaction ratio when the amount of sulfur was larger than the theoretical amount by a factor of 1.3 was very small. Therefore, it is appropriate to set the amount of sulfur to be larger than the theoretical amount by a factor of about 1.1 to about 1.3.

Table 2 shows a comparison between the reaction ratio achieved in the example in which a raw material prepared by mixing antimony trioxide having an average particle size of 0.4, 1.2, or 7.1 micrometers and a sulfur powder was used, and the reaction ratio achieved in the comparative example in which a raw material prepared by mixing antimony metal and a sulfur powder was used. The amount of sulfur was set to be larger than the stoichiometric amount by a factor of about 1.2.

As is clear from Table 2, the reaction ratio achieved in the example was significantly higher than the reaction ratio achieved in the comparative example.

TABLE 2

| Raw material | Average particle size of antimony trioxide or antimony (raw material) (micrometers) | Ratio in product (wt %) | | |
|---|---|---|---|---|
| | | $Sb_2S_3$ | $Sb_2O_3$ | Sb |
| Example ($Sb_2O_3$ powder + S powder) (molar ratio: 2.0:10.9) | 0.4 | 98.0 | 2.0 | <0.1 |
| | 1.2 | 98.3 | 1.7 | <0.1 |
| | 7.1 | 96.3 | 3.7 | <0.1 |
| Comparative Example (Sb powder + S powder] (molar ratio: 2.0:3.6) | 30 | 93.7 | 0.7 | 5.6 |

The invention claimed is:

1. A method for producing antimony trisulfide comprising charging a reaction vessel with a raw material consisting essentially of a mixture of antimony trioxide powder and sulfur powder, and heating the inside of the reaction vessel to a temperature of from 250° C. to 700° C. to melt the sulfur powder and to react the antimony trioxide with the melted sulfur to generate antimony trisulfide.

2. The method for producing antimony trisulfide according to claim 1, wherein the antimony trioxide powder has an average particle size of 2 micrometers or less.

3. The method for producing antimony trisulfide according to claim 2, wherein the sulfur is used in an amount larger than a stoichiometric amount of a product, and the inside of the reaction vessel is heated after filling the reaction vessel with an inert gas.

4. The method for producing antimony trisulfide according to claim 3, wherein the reaction vessel includes a gas inlet and a gas outlet, the inert gas is fed through the gas inlet before heating the reaction vessel to fill the reaction vessel with the inert gas, and the inert gas is fed through the gas inlet after completion of production of antimony trisulfide inside the reaction vessel to discharge gas from the reaction vessel through the gas outlet.

5. The method for producing antimony trisulfide according to claim 2, wherein antimony trisulfide produced is melted inside the reaction vessel by heating the antimony trisulfide to a temperature equal to or higher than its melting point, discharged from the reaction vessel in the form of a liquid, and solidified by cooling.

6. The method for producing antimony trisulfide according to claim 1, wherein the sulfur is used in an amount larger than a stoichiometric amount of a product, and the inside of the reaction vessel is heated after filling the reaction vessel with an inert gas.

7. The method for producing antimony trisulfide according to claim 6, wherein the reaction vessel includes a gas inlet and a gas outlet, the inert gas is fed through the gas inlet before heating the reaction vessel to fill the reaction vessel with the inert gas, and the inert gas is fed through the gas inlet after completion of production of antimony trisulfide inside the reaction vessel to discharge gas from the reaction vessel through the gas outlet.

8. The method for producing antimony trisulfide according to claim 6, wherein antimony trisulfide produced is melted inside the reaction vessel by heating the antimony trisulfide to a temperature equal to or higher than its melting point, discharged from the reaction vessel in the form of a liquid, and solidified by cooling.

9. The method for producing antimony trisulfide according to claim 7, wherein antimony trisulfide produced is melted inside the reaction vessel by heating the antimony trisulfide to a temperature equal to or higher than its melting point, discharged from the reaction vessel in the form of a liquid, and solidified by cooling.

10. The method for producing antimony trisulfide according to claim 1, wherein antimony trisulfide produced is melted inside the reaction vessel by heating the antimony trisulfide to a temperature equal to or higher than its melting point, discharged from the reaction vessel in the form of a liquid, and solidified by cooling.

11. The method for producing antimony trisulfide according to claim 1, wherein the sulfur is used in an amount larger than a stoichiometric amount of a product, and the inside of the reaction vessel is heated after filling the reaction vessel with an inert gas.

12. The method for producing antimony trisulfide according to claim 11, wherein the reaction vessel includes a gas inlet and a gas outlet, the inert gas is fed through the gas inlet before heating the reaction vessel to fill the reaction vessel with the inert gas, and the inert gas is fed through the gas inlet after completion of production of antimony trisulfide inside the reaction vessel to discharge gas from the reaction vessel through the gas outlet.

13. The method for producing antimony trisulfide according to claim 12, wherein antimony trisulfide produced is melted inside the reaction vessel by heating the antimony trisulfide to a temperature equal to or higher than its melting point, discharged from the reaction vessel in the form of a liquid, and solidified by cooling.

14. The method for producing antimony trisulfide according to claim 11, wherein antimony trisulfide produced is melted inside the reaction vessel by heating the antimony trisulfide to a temperature equal to or higher than its melting point, discharged from the reaction vessel in the form of a liquid, and solidified by cooling.

15. The method for producing antimony trisulfide according to claim 1, wherein antimony trisulfide produced is melted inside the reaction vessel by heating the antimony trisulfide to a temperature equal to or higher than its melting point, discharged from the reaction vessel in the form of a liquid, and solidified by cooling.

16. The method for producing antimony trisulfide according to claim 1, wherein the antimony trisulfide generated has a purity of at least about 95% by mass.

\* \* \* \* \*